(No Model.)

W. W. CONNER.
MEANS FOR AUTOMATICALLY LUBRICATING VEHICLE AXLES.

No. 559,076.            Patented Apr. 28, 1896.

Witnesses:
F. L. Ourand
A. T. Smith

Inventor:
Wm. W. Conner.
By H. Davidson
Attorney.

UNITED STATES PATENT OFFICE.

WILLIAM W. CONNER, OF DOVER, DELAWARE.

MEANS FOR AUTOMATICALLY LUBRICATING VEHICLE-AXLES.

SPECIFICATION forming part of Letters Patent No. 559,076, dated April 28, 1896.

Application filed January 31, 1896. Serial No. 577,524. (No model.)

*To all whom it may concern:*

Be it known that I, WILLIAM W. CONNER, a citizen of the United States, residing at Dover, in the county of Kent and State of Delaware, have invented certain new and useful Improvements in Means for Automatically Lubricating Vehicle-Axles; and I do declare the following to be a full, clear, and exact description of the invention, such as will enable others skilled in the art to which it appertains to make and use the same.

My invention has relation to means for automatically lubricating vehicle-axles, and the object is to provide a lubricating attachment of simple construction adapted to be connected to the hub and formed with an aperture opening into the bore of the hub and adapted to convey the lubricating substance to the surface of the spindle.

I have fully and clearly illustrated my invention in the accompanying drawings, wherein—

Figure 1:
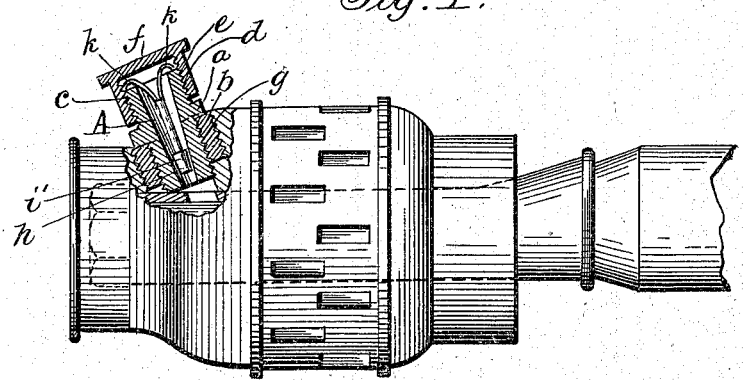
Figure 2:
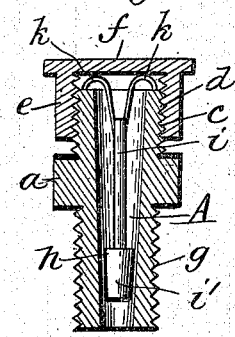

Figure 1 is a view showing the lubricator connected to the hub of a vehicle. Fig. 2 is a central vertical section of the lubricator.

A designates the lubricating-tube, the bore $l$ of which is preferably made slightly tapering from top to bottom, as shown in the drawings. Midway between the ends of the tube is an exterior annular shoulder or flange $a$, which sets down tight on the surface of the holding-nut $b$. The upper exterior end of the lubricating-tube is provided with screw-threads $c$, with which engage the screw-threads $d$ in cut with the interior of the depending annular flange $e$ of the cap $f$, which serves to cover and close the tube and exclude all foreign substances. The lower exterior end of the lubricating-tube is provided with screw-threads $g$, which engage with the screw-threads in the interior of the holding-nut $b$ set in the hub, substantially as shown. In the interior of the lubricating-tube is disposed a valve $h$, consisting of a stem $i$, terminating in an enlargement $i'$ at its lower end, which fits loosely in the bore of the lubricating-tube and serves to regulate the flow of the lubricating material to the axle of the vehicle. The upper end of the valve $h$ is provided with short spring ears or arms $k$, the ends of which rest upon the top of the side walls of the lubricating-tube, as shown, the rise or descent of the valve being regulated by the increase or decrease of the pressure upon the surface of the spring-ears caused by the adjustment of the cap on the tube.

To use my improvement, the oil or other lubricating medium is placed in the tube and the cap screwed in place. The lubricating substance then descends and supplies the lubrication essential to spindle.

Having thus described my invention, what I claim, and desire to secure by Letters Patent, is—

In combination with a vehicle-hub formed with an opening leading radially through the hub, a holding-nut, provided with interior screw-threads seated in said opening, a lubricating-tube in the holding-nut, having a slightly-tapering bore, and screw-threads on its lower end to engage in the holding-nut, and an annular flange to set down thereon, a valve formed with a stem terminating in an enlargement at its lower end and having spring-ears at its upper end, and a screw-threaded cap to close the tube and regulate the position of the valve, substantially as and for the purpose specified.

In testimony whereof I hereunto affix my signature in presence of two witnesses.

WILLIAM W. CONNER.

Witnesses:
JOHN C. PENNUCILL,
CHAS. DENNEY.